G. CROSBY.
ELECTRICAL SYSTEM OF DISTRIBUTION.
APPLICATION FILED MAR. 7, 1916.
1,264,021.
Patented Apr. 23, 1918.
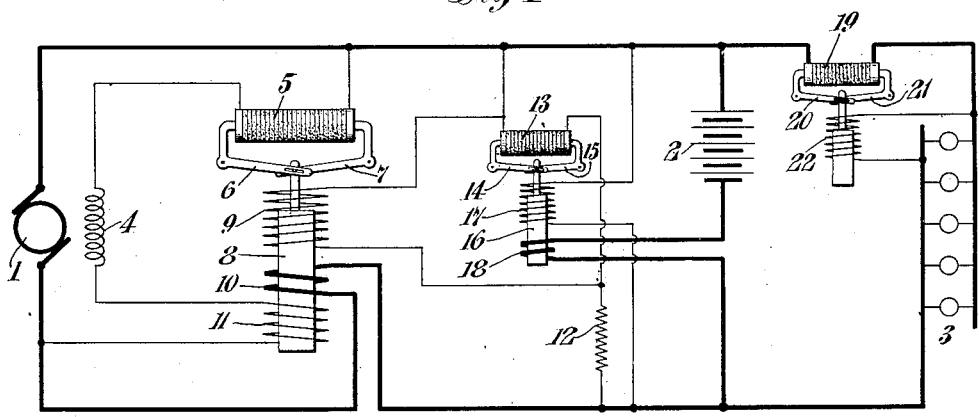
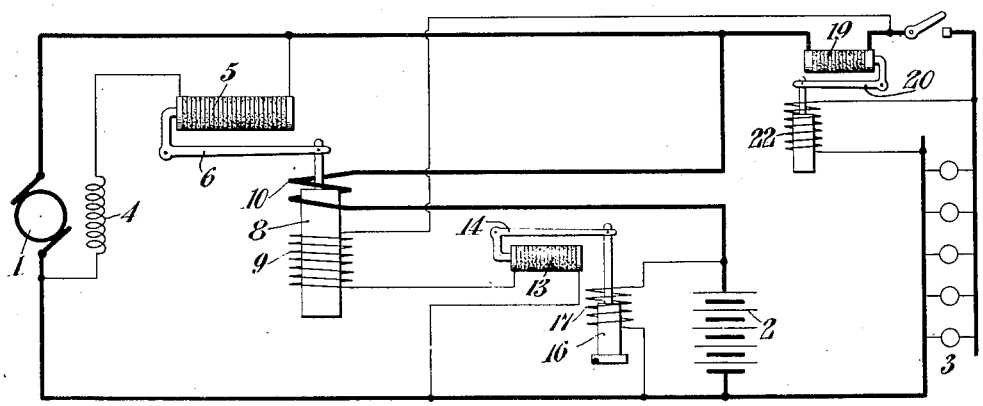

UNITED STATES PATENT OFFICE.

GORHAM CROSBY, OF GLEN RIDGE, NEW JERSEY, ASSIGNOR TO GOULD COUPLER COMPANY, A CORPORATION OF NEW YORK.

ELECTRICAL SYSTEM OF DISTRIBUTION.

1,264,021.   Specification of Letters Patent.   Patented Apr. 23, 1918.

Application filed March 7, 1916. Serial No. 82,622.

*To all whom it may concern:*

Be it known that I, GORHAM CROSBY, a citizen of the United States, and a resident of Glen Ridge, county of Essex, State of New Jersey, have invented certain new and useful Improvements in Electrical Systems of Distribution, of which the following is a specification.

My invention relates to improvements in electrical systems of distribution, more particularly to systems in which a generator is adapted to charge a storage battery and automatic means are provided for regulating the generator. The main object of the invention is to provide a simple and efficient apparatus for limiting the charging current during the earlier stages of the charging and cutting down the charging current in an effective manner during the later stages of the charging. Further objects, features and advantages will more clearly appear in the detailed description given below taken in connection with the accompanying sheet of drawings which forms a part of this specification.

In the drawings

Figure 1 is a diagram illustrating a system embodying the improvements in one form, and Fig. 2 illustrates a modified system.

Referring to Fig. 1, 1 represents a generator and 2 a storage battery connected to be charged thereby, 3 represents the work circuit containing lamps or other translating devices connected across the battery and generator so as also to be supplied from the generator 1 and from the battery 2 when the generator is not running: 4 represents the shunt field windings of the generator 1 and in series with these field windings is a carbon pile 5 operated upon at one end by a lever 6 and at the other end by a lever 7, both of which levers are operated by the plunger 8 of a solenoid having a voltage coil 9, a current coil 10 and an auxiliary coil 11. The voltage coil 9 is connected across the generator and battery and has in series therewith a resistance 12 and in shunt therewith a small carbon pile 13 operated at one end by a lever 14 and at the other end by a lever 15, both of which levers are operated by a plunger 16 controlled by a solenoid having a voltage coil 17 connected across the battery and an auxiliary opposing current coil 18 connected in the battery circuit. The current coil 10 of the first mentioned solenoid is connected in the main generator circuit between the generator and battery. The auxiliary coil 11 is connected in series with the shunt field windings 4. A lamp regulator comprising a carbon pile 19 is connected in series between the battery and the lamps operated upon at one end by lever 20 and at the other end by lever 21, both of which levers are controlled by a solenoid coil 22 connected across the work circuit in order to maintain the voltage across the work circuit substantially constant in a manner well understood by those skilled in the art.

In operation the weight of the plunger 16 acts to operate the levers 14 and 15 to compress the pile 13 to its maximum so that the resistance in shunt to the coil 9 remains constant as is also the resistance 12 in series therewith. During normal operation, or until the battery voltage reaches a predetermined value the strength of coil 9 does not vary materially, but any change in speed of the generator is compensated for by the action of coil 10 so as to limit the current output of the generator as will be clearly understood by those skilled in the art. As the speed of the generator increases coil 10 will act to operate levers 6 and 7 to increase the resistance pile 5 in order to limit the generator current and this increase of resistance of the pile 5 not only weakens the field 4 but materially decreases the current in coil 11 which is wound to oppose coil 10 so that coil 10 becomes more effective at the higher speeds and will limit the current to a lesser value. This promotes better commutation at the higher speeds. During the earlier stages of the charging of the battery there may be a gradual slight change in voltage which will mean a gradual slight change in the strength of the coil 9 so that assuming constant speed there will be a slight decrease in the current maintained. However, it may be assumed that the current in the coil 10 is maintained substantially constant until the battery reaches a certain state of charge. Upon the battery reaching a certain state of charge, as indicated by the attainment of a certain voltage across the battery, the coil 17 becomes of sufficient strength to raise the core 16 and increase the resistance of pile 13 very materially. This action greatly increases the current in coil 9 by increasing the resistance in shunt thereto so that the generator voltage is decreased and consequently the charging current is decreased. This decrease in charging current weakens the coil 18 which is wound to oppose the coil 17 so that coil 17 becomes effective to raise its lever at the lesser voltage and hence the generator voltage further decreases and the battery charging current is rapidly tapered off to prevent overcharging.

Various changes and modifications may be made without departing from the spirit and scope of the invention; for example any one or more of the following changes may be made. Coil 11 may be omitted. Coil 10 may be connected in the battery circuit. A simple form of single lever may be used to operate the carbon piles. Carbon pile 13 may be placed in series instead of in shunt with the coil 9. Coil 18 may be omitted. Coil 9 may be connected across the lamp circuit as distinguished from across the generator or battery. These modifications are illustrated in Fig. 2. Accordingly I do not desire to be limited to the details shown and described, but desire to cover all systems which come within the language of the appended claims.

What I claim as new and desire to secure by Letters Patent is:

1. An electrical system of distribution having in combination, a generator, a storage battery connected to be charged thereby, a regulating medium for controlling the generator field, an electromagnetic device controlling said medium, said device having a current coil and a voltage coil acting on a common means to control said medium, a carbon pile for varying the current in said voltage coil and a coil responsive to battery voltage changes for controlling said pile to cause it to vary the current in said first mentioned voltage coil to limit the voltage of the current when the battery becomes charged to a predetermined extent and a current coil connected between the generator and battery and normally opposing the action of said second voltage coil whereby as the charging current decreases the said second voltage coil is rendered more effective.

2. An electrical system of distribution having in combination, a generator, a storage battery connected to be charged thereby, a regulating medium for controlling the generator field, an electromagnetic device controlling said medium, said device having a current coil and a voltage coil acting on a common means to control said medium, a carbon pile for varying the current in said voltage coil and a coil responsive to battery voltage changes for controlling said pile to cause it to vary the current in said first mentioned voltage coil to limit the voltage of the current when the battery becomes charged to a predetermined extent and a coil coöperating with said current coil and acting to decrease the current output of the generator responsive to certain speed increases of the generator.

3. An electrical system of distribution having in combination, a generator, a storage battery connected to be charged thereby, a carbon pile regulating the generator field, a lever operating on each end of said pile, an electromagnetic device controlling both of said levers simultaneously, said electromagnetic device having a voltage coil and a current coil acting on a common means to control said pile, a carbon pile for varying the current in said voltage coil and a coil responsive to battery voltage changes for controlling said pile to cause it to vary the current in said first mentioned voltage coil to limit the voltage of the generator when the battery becomes charged to a predetermined extent, a coil coöperating with said current coil and acting to decrease the current output of the generator responsive to certain speed increases of the generator and a current coil connected between the generator and battery and normally opposing the action of said second voltage coil whereby as the charging current decreases the said second voltage coil is rendered more effective.

In testimony whereof, I have signed my name to this specification.

GORHAM CROSBY.